US006976024B1

(12) United States Patent
Chavez, Jr. et al.

(10) Patent No.: US 6,976,024 B1
(45) Date of Patent: Dec. 13, 2005

(54) BATCH SUBMISSION API

(75) Inventors: Luciano Chavez, Jr., Cedar Park, TX (US); Steven Lawrence Dobbelstein, Austin, TX (US)

(73) Assignee: International Buisness Machines Corporation, Armonk, NY (US)

( * ) Notice: Subject to any disclaimer, the term of this patent is extended or adjusted under 35 U.S.C. 154(b) by 923 days.

(21) Appl. No.: 09/687,094

(22) Filed: Oct. 12, 2000

(51) Int. Cl.[7] .............................................. G06F 17/30
(52) U.S. Cl. ....................... 707/10; 707/200; 707/203; 707/204; 707/205
(58) Field of Search .......................... 707/10, 200–205; 709/219

(56) References Cited

U.S. PATENT DOCUMENTS

| | | | |
|---|---|---|---|
| 5,327,559 A | 7/1994 | Priven et al. | 395/700 |
| 5,524,203 A | 6/1996 | Abe | 395/182.04 |
| 5,889,896 A | 3/1999 | Meshinsky | 382/305 |

*Primary Examiner*—Jean M. Corrielus
*Assistant Examiner*—Cam Troung
(74) *Attorney, Agent, or Firm*—David A. Mims, Jr.; Rudolf O. Sigesmund

(57) ABSTRACT

An apparatus and method is disclosed for aggregating API calls within a higher level Batch Submission API (BSA) having a sender BSA (SBSA) and a receiver BSA (RBSA). Specifically, one or more directory limit records needed for the restoration process on a particular server are grouped by the SBSA into one large buffer. The SBSA validates batch records prior to transmitting them to a receiver. The SBSA does not transmit the records if either (1) all of the records fail pre-submission validation or (2) a certain percentage of the records fail pre-submission validation. Once the SBSA has performed the pre-submission validation of the records, a buffer and count (BC) is transmitted to a receiver BSA (RBSA) at a second computer. The BC contains records passing pre-submission validation checks and a count of the records contained within the buffer. The RBSA would then process each of the directory limits records contained in the buffer at the second computer.

14 Claims, 5 Drawing Sheets

BATCH SUBMISSION API

FIELD OF THE INVENTION

The present invention relates to an apparatus and method for reducing remote API network traffic and increasing API performance through the use of a batch submission API.

BACKGROUND OF THE INVENTION

When backing up and restoring directory limits in an operating system, add, set and get routines work only on a single directory path. Since the operation on a single path may require multiple Add, Set or Get Application Program Interface (API) calls, restoration of a large amount of directory paths can generate a large amount of network traffic. Moreover, restoration of a large amount of directory paths can require sending and receiving the API and the data for each operation across the network. For example, in a network of computers, a first computer in the network may have a failed hard drive and a second computer may contain backup data for the first computer. An administrator may want to invoke a backup and restore routine. If there happened to be 64,000 target directories and all 64,000 directories had to be updated, there would be 128,000 round trip operations across the network. In some cases the backup and restore operations could take several days. What is needed is a way to reduce the time required to complete the backup and restore operations. In order to reduce the traffic, one way would be to batch all of the operations at one computer and send the batch to the second computer.

Batch processing has been used to increase the efficiency of data handling. U.S. Pat. No. 5,889,896 discloses batch processing of raw image data which has been scanned into the memory of a processing system. System throughput is enhanced by permitting a workstation to execute a task on a batch of node index file records and to return the modified index file records to the stage of a work queue. However, the prior art does not address the problem of applying batch submission to reduce network traffic when backing up and restoring directory limits in an operating system.

SUMMARY OF THE INVENTION

The invention which meets the needs identified above is an apparatus and method aggregating API calls within a higher level Batch Submission API (BSA) having a sender BSA (SBSA) and a receiver BSA (RBSA). Specifically, one or more directory limit records needed for the restoration process on a particular server are grouped by the SBSA into one large buffer. The SBSA validates batch records prior to transmitting them to a receiver. The SBSA does not transmit the records if either (1) all of the records fail pre-submission validation or (2) a certain percentage of the records fail pre-submission validation. Optionally, the SBSA may transmit records marked invalid which will not be processed if the count of invalid records is less than a predetermined number. A record fails if flags are not set or paths are not covered. For example, a pass rate for records may be set at 80%. If 80% of the records in the batch pass pre-submission validation, the SBSA will transmit the records to the second computer. The remaining 20% of the records are marked invalid. Optionally, some invalid records may be sent. If the number of records marked invalid exceeds the pre-determined number, the valid records are not sent. If the number of records marked invalid does not exceed the pre-determined number, the valid records are sent.

Once the SBSA has performed the pre-submission validation of the records, a buffer and count (BC) is transmitted to RBSA at a second computer. The BC contains records passing pre-submission validation checks and a count of the records contained within the buffer. The count of the records contained in the buffer is equal to the total count of records in the backup file minus the number of records that fail pre-submission validation (records failing pre-submission validation are excluded). The RBSA installed on the second computer is responsive to a BC and would allow the BC to be transmitted to the second computer. The RBSA would ignore individual or multiple API calls and would only accept a BC. The number of network transmissions would thereby be reduced. The RBSA processes each of the directory limits records contained in the BC at the second computer. If one or more of the records failed, a vector of return code structures containing the index or ordinal matching the failing record along with the return code would be returned and the count of failed records contained in the vector. If all records in the BC completed successfully, then no return code structures would be returned and the count of failed records would be zero. By having the RBSA process the BC at the second computer, the back and forth traffic that would occur if each operation were performed individually across the network is significantly reduced. Moreover, system efficiency is enhanced because the needed API calls to process the record are issued locally at the second computer. The RBSA would handle the logic to Add a directory limit where one did not exist, Set a directory limit if one existed and Get information if required for an Add or Set.

DETAILED DESCRIPTION OF THE PREFERRED EMBODIMENT

Figure 1:
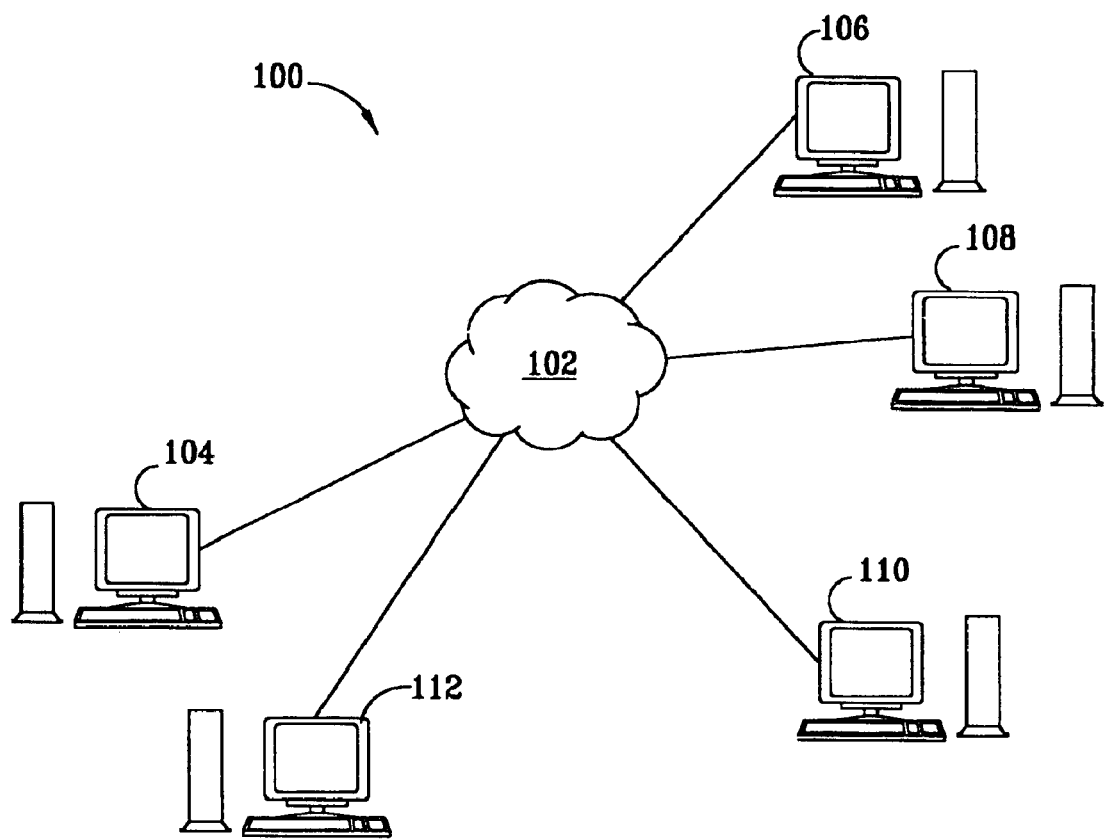
FIG. 1 depicts a distributed data processing system in which the invention may be implemented.

FIG. 1 depicts a pictorial representation of a distributed data processing system in which the present invention may be implemented and is intended as an example, and not as an architectural limitation, for the process of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections, personal computers or network computers. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN).

Figure 2:
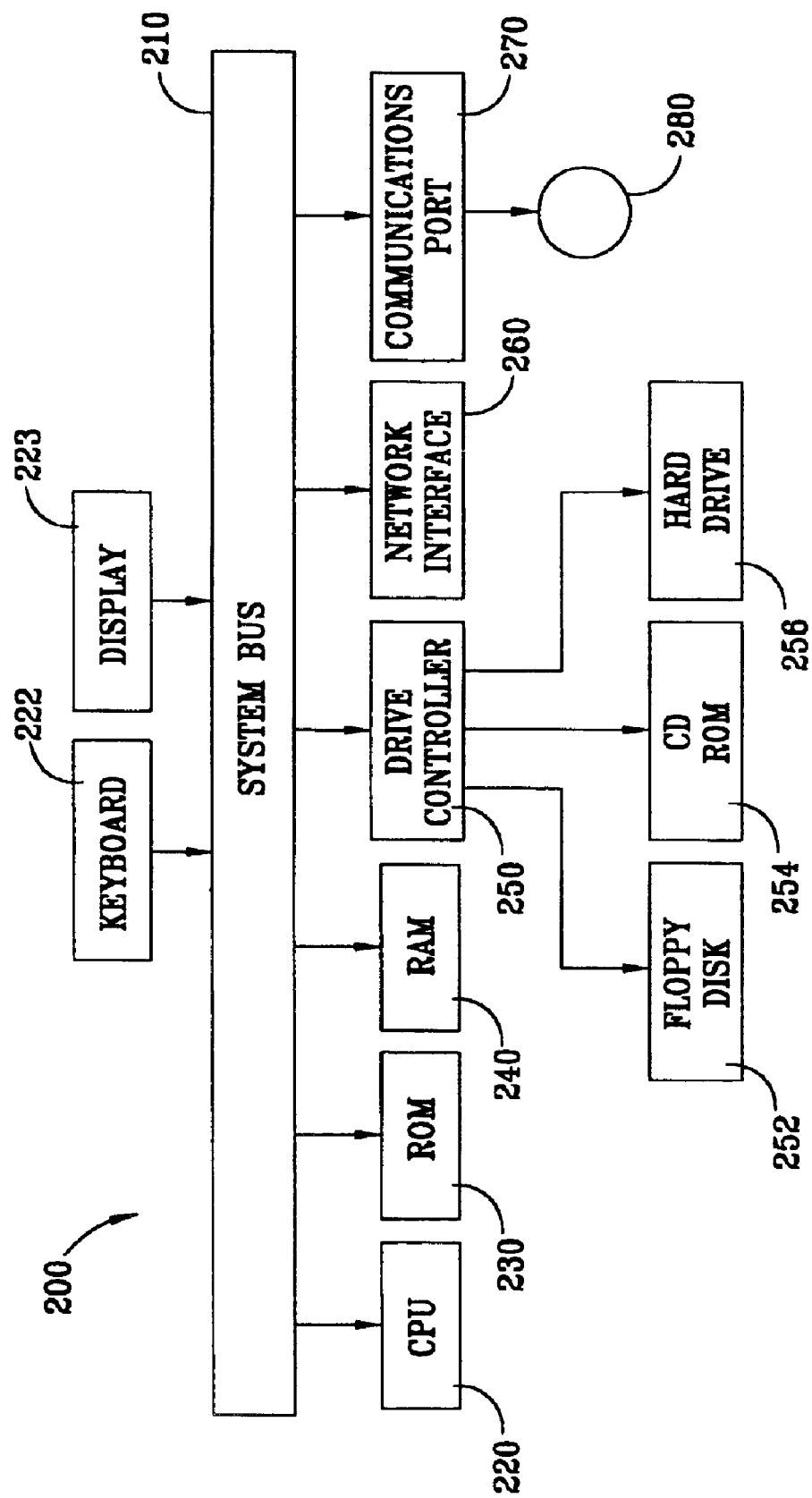
FIG. 2 depicts a computer in which the software to implement the invention may be stored.

FIG. 2 depicts computer 200. Although the depicted embodiment involves a personal computer, a preferred embodiment of the present invention may be implemented in other types of data processing systems. An exemplary hardware arrangement for computer 200 follows. Keyboard 222 and display 223 are connected to system bus 210. Read only memory (ROM) 230 contains, typically, boot strap routines and a Basic Input/Output System (BIOS) utilized to initialize Central Processing Unit (CPU) 220 at start up. Random Access Memory (RAM) 240 represents the main memory utilized for processing data. Driver controller 250 interfaces one or more disk type drives such as floppy disk drive 252, CD ROM 254 and hard disk drive 256. The number and type of drives utilized with a particular system will vary depending upon user requirements. A network interface 260 permits communications to be sent and received from a network. Communications port 270 may be utilized for a dial up connection to one or more networks while network interface 260 is a dedicated interface to a particular network. Programs for controlling the apparatus shown in FIG. 2 are typically stored on a disk drive and then loaded into RAM for execution during the start-up of the computer.

Figure 3A:
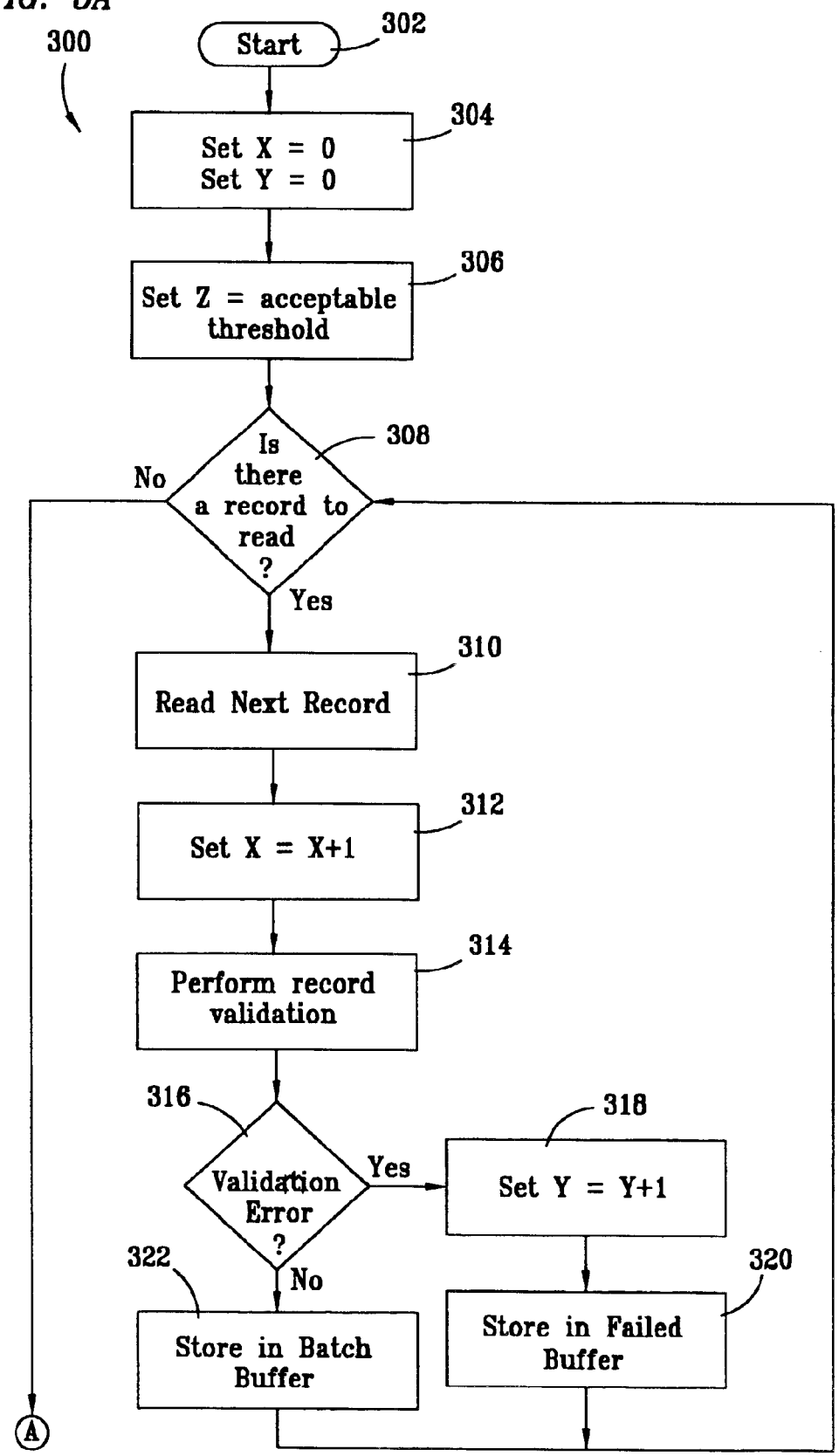
FIG. 3 depicts a flow chart for the batch submission API.
Figure 3B:
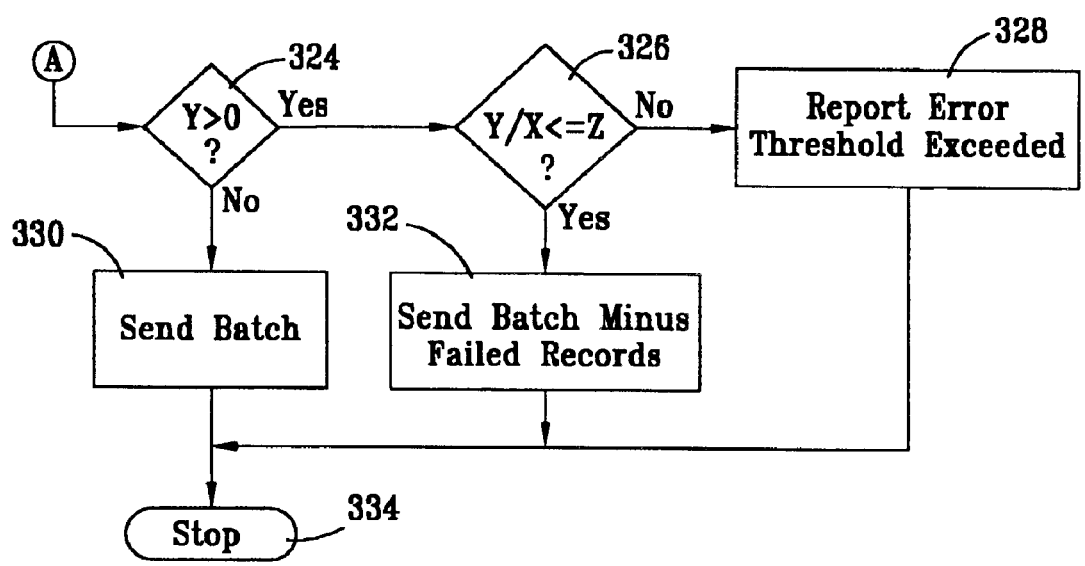

FIG. 3 depicts a flow chart of the Sender Batch Submission Application Program Interface (SBSA). The SBSA is located in a first computer containing back up files which are to be used to restore directory limits to the operating system of a second computer that has had a failure. In the preferred embodiment, the first computer is a client computer and the second computer is a server computer. The program is invoked (302) and initialized (304). "X" represents the total count of records in the backup files. "Y" represents the number of records that fail validation. At initialization, "X" is set to zero and "Y" is set to zero. The acceptable threshold "Z" is set (306). The program then determines whether there is a record to read (308). If there is a record to read, then the program will read the next record (310). Next, X is set equal to X+1 (312). The program then performs record validation (314). Next, the program determines if a validation error has occurred (316). A validation error occurs if flags are not set or paths are not covered. If a validation error has occurred, then Y is set equal to Y+1 (318) and the record is stored in a failed buffer (320). After the record is stored in the failed buffer, the program goes to step 308 to determine if there is a record to read. If a validation error has not occurred, then the record is stored in a batch buffer (322) and the program returns to step 308 to determine if there is another record to read.

At step 308, if the program determines that there is not another record to read (the last record has been examined), then the program goes to step 324 to determine whether Y is greater than 0. If Y is greater than 0, then the program goes to step 326 and determines whether Y/X is less than or equal to "Z." "Z" is a variable that represents the acceptable error threshold percentage for pre-submission validation. The value of "Z" is given to the SBSA, the program supplying the batch records. For example, if Z is set to 20%, then if Y/X is less than or equal to 20%, the program would send the records in the batch buffer and a count of the records in the batch buffer. The batch and the count of records shall be referred to as the batch and count (BC). The count of records is equal to the total count of records minus the number of records that fail pre-submission validation (X-Y) because failed records are not sent. If Y/X is not less than or equal to Z (greater than Z), then a report is displayed that error threshold "Z" has been exceeded (328). If the acceptable error threshold "Z" is exceeded, the batch as a whole is considered in error and not submitted. If Y/X is less than or equal to "Z" then the batch of records minus the failed records and count of records (BC) is sent (332).

If at step 308, the program determines that Y equals 0 (Y is not greater than 0), then the BC is sent to the receiver (330). When a BC is sent, a report will be received from the second computer as described below.

Figure 4:
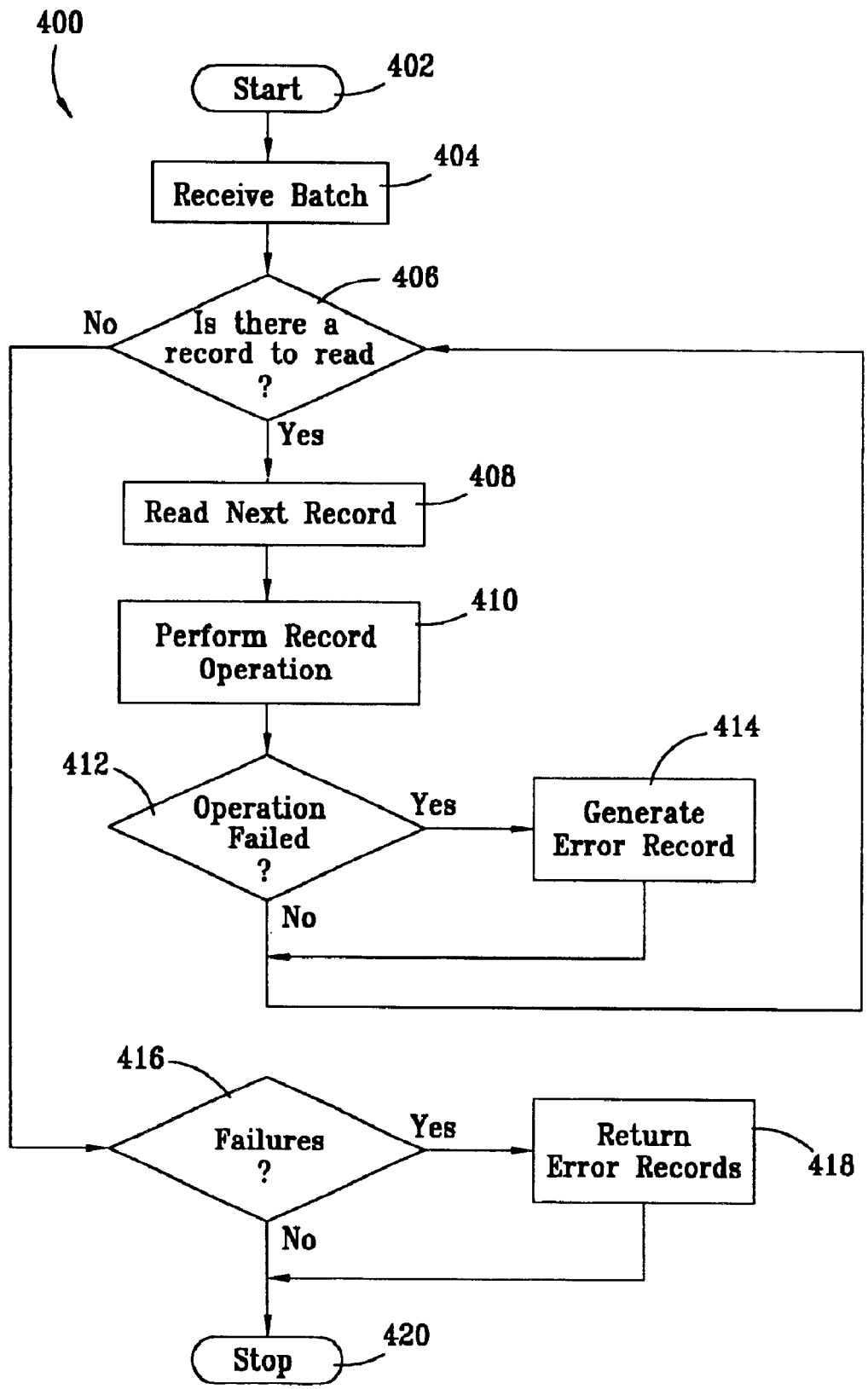
FIG. 4 depicts a flow chart for the server process.

FIG. 4, depicts the process at the second computer. The second computer contains the Receiver Batch Submission Application Program Interface (RBSA). The RBSA ignores individual or multiple API calls and only accepts a BC. If a BC is sent, the RBSA receives the BC (404) and determines whether there is a record to be read (406). If there is a record to be read, the RBSA reads the next record (408). The RBSA then performs an operation on the first record contained in the BC (410). If the record fails (412), the RBSA generates an error record (414) and goes to step 406. The RBSA then determines whether there is another record to be read (406). If there is another record to be examined, the RBSA reads the next record (408). If there is not another record to be read, the RBSA determines whether there are failed records (416). If there are failed records, a vector of return code structures containing the index or ordinal matching the failing record along with the return code is returned along with the count of failed records contained in the vector (418). If there are no failed records, a report is sent. If all records in the BC completed successfully, then no return code structures would be returned and the count of failed records would be zero. By having the RBSA process the BC at the second computer, the back and forth traffic that would occur if each operation were performed individually across the network is significantly reduced. Moreover, system efficiency is enhanced because the needed API calls to process the records in the BC are issued locally at the second computer. The RBSA would handle the logic to Add a directory limit where one did not exist, Set a directory limit if one existed and Get information if required for an Add or Set. In the event that the second computer does not have a RBSA installed, the BC will not be recognized and an error code will be returned to the first computer. Upon receipt of the error code, the first computer will process the records without using the SBSA, or in other words, as the first computer would have done without having the enhancement of the SBSA.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A programmable apparatus comprising:
   a first computer having a first computer memory containing a plurality of directory limits for the operating system of a second computer in a back up file;
   a sender batch submission application interface in the first computer memory;
   a network connecting the first computer and the second computer;
   the second computer having a second computer memory;
   a receiver batch submission application interface in the second computer memory that only accepts a buffer and count;
   the first computer being directed by the sender batch submission application interface to examine each record in the plurality of directory limits to determine whether a flag is not set or whether a path is not covered;

to identify a record where a flag is not set or a path is not covered as an invalid record and any other record as valid record;

to place the valid records in a batch buffer and the invalid records in a failed buffer; and to determine the number of records in the batch buffer and to transmit the buffer and count to the second computer; and the second computer, being directed by the receiver batch submission application interface, receives the buffer and count and performs an operation on each record in the buffer and count to add a directory, set a directory limit, or to get information if required to add a directory or to set a directory limit;

wherein said sender batch submission application interface directs said first computer to determine a total count of records in the file, to determine a total number of invalid records, and to determine a number by dividing the total number of invalid records by the total count of records in the file, and if the number is less than or equal to a predetermined number, then said sender batch submission application interface directs said first computer to send the buffer and count;

whereby transmission of data over the network when backing up and restoring directory limits in the operating system is reduced.

2. The programmable apparatus of claim 1 wherein if the number is greater than the predetermined number, said sender batch submission application interface directs said first computer to display a report that an error threshold has been exceeded.

3. The programmable apparatus of claim 1 wherein said receiver batch submission interface directs said second computer to perform an operation on each record, and where an operation on a record failed, to generate an error record.

4. The programmable apparatus of claim 1 wherein said receiver batch submission interface directs said second computer to determine whether any records failed to be operated on and, responsive to a determination that there were records that failed to be operated on, to return the records that failed to be operated on to the first computer.

5. The buffer and count of claim 1 wherein the count of records is equal to the total count of records in the backup file minus the number of invalid records.

6. A computer readable memory for causing a first computer, having a file containing a plurality of records, to validate the plurality of records for transmission to a second computer comprising:

a computer readable storage medium;

a sender batch submission application interface stored in said storage medium;

the storage medium so configured by said sender batch submission application interface, causes the computer to examine each record in a plurality of directory limits and to determine whether each record is a valid record or an invalid record;

to place the valid records in a batch buffer and the invalid records in a failed buffer;

to determine the number of records in the batch buffer and to transmit a buffer and count to the second computer;

wherein a record is invalid if a flag is not set or a path is not covered, and any other record is valid; and wherein the buffer and count is transmitted to the second computer so that a receiver batch submission application interface in a memory of the second computer can add a directory, set a directory limit or and get information in order to add a directory or to set a directory limit;

wherein said sender batch submission application interface directs said first computer to determine a total count of records in the file, to determine a total number of invalid records, and to determine a number by dividing the total number of invalid records by the total count of records in the file, and if the number is less than or equal to a predetermined number, then said sender batch submission application interface directs said computer to send the buffer and count;

whereby transmission of data over the network when backing up and restoring directory limits in the operating system is reduced.

7. The sender batch submission application interface of claim 6, and where the number is greater than the predetermined number, said sender batch submission application interface directs said computer to display a report that an error threshold has been exceeded.

8. The buffer and count of claim 6 wherein the count of records is equal to the total number of records in the file containing a plurality of records minus the number of invalid records.

9. A computer implemented process to accomplish presubmission validation and batch submission of directory limits from a backup file comprising:

using a sender batch submission application interface in the memory of a first computer, performing the following steps;

initializing a total count of records in a file and the total number of invalid records in the file;

retrieving a record;

adding one to the total count of records in the file;

examining the record to determine whether a flag is not set or a path is not covered;

identifying a record where a flag is not set or a path is not covered as an invalid record and any other record as a valid record;

responsive to determining that there is a validation error in the record, adding one to the total number of invalid records in the file and storing the record in a failed buffer;

responsive to determining that there is no validation error in the record; storing the record in a batch buffer;

determining whether the last record has been retrieved;

responsive to a determination that the last record has been retrieved, determining whether the total number of invalid records in the file is greater than zero;

responsive to a determination that the total number of invalid records in the file is greater than zero, sending a buffer and count, using a receiver batch submission application interface in the memory of a second computer, performing the following steps:

receiving the buffer and count;

retrieving a record;

determining whether the last record has been retrieved;

operating on the record to add a directory, set a directory limit or get information in order to add a directory or to set a directory limit and determining whether the operation failed;

responsive to a determination that the operation failed, generating an error record;

responsive to determining that the last record has been retrieved, determining whether there have been any failures; and responsive to a determination that there have been failures, returning the error records;

whereby transmission of data over the network when backing up and restoring directory limits in the operating system is reduced.

10. The computer implemented process of claim 9 wherein the count of records is equal to the total number of records in the backup file minus the number of invalid records.

11. A method for reducing remote application interface network traffic and increasing application interface performance in a network having a first computer and a second computer comprising:

validating a plurality of records in a back up file, comprising a plurality of directory limits for the operating system of a second computer, prior to submission in the first computer by examining each of the plurality of records to determine whether a flag is not set or a path is not covered;

identifying a record where a flag is not set or a path is not covered as an invalid record and any other record as a valid record;

storing said records in a buffer and count storing an invalid record in a failed buffer and storing a valid record in a batch buffer; and calculating a count of records equal to the count of total records read in the validating records prior to submission step minus the number of invalid records;

transmitting said buffer and count to said second computer;

receiving said buffer and count in said second computer; and operating on said records in said second computer to add a directory, set a directory limit or get information in order to add a directory or to set a directory limit;

whereby transmission of data over the network when backing up and restoring directory limits in the operating system is reduced.

12. The validating records prior to submission of claim 11 further comprising the steps of:

initializing a total count of records in a file and the total number of invalid records in the file;

retrieving a record;

adding one to the total count of records in the file; and responsive to determining that there is a validation error, adding one to the total number of invalid records in the file.

13. The method of claim 11 wherein the sending step further comprises the steps of:

responsive to a determination that the last record has been retrieved, determining whether the total number of invalid records in the file is greater than zero;

responsive to a determination that the total number of invalid records in the file is greater than zero, transmitting the buffer and count.

14. The method of claim 11 wherein the operating step further comprises the steps of:

operating on the record and determining whether the operation failed; and responsive to a determination that the operation failed, generating an error record.

* * * * *